United States Patent
Ghiri et al.

(10) Patent No.: US 12,130,539 B2
(45) Date of Patent: Oct. 29, 2024

(54) SYSTEM AND METHOD FOR DUAL-COMB MICROWAVE IMAGING

(71) Applicant: Tiposi, Inc., Milpitas, CA (US)

(72) Inventors: Reza Ebrahimi Ghiri, Milpitas, CA (US); Jahan Ghofraniha, San Jose, CA (US); Shih H Mo, Milpitas, CA (US)

(73) Assignee: Tiposi, Milpitas, CA (US)

( * ) Notice: Subject to any disclaimer, the term of this patent is extended or adjusted under 35 U.S.C. 154(b) by 507 days.

(21) Appl. No.: 17/574,413

(22) Filed: Jan. 12, 2022

(65) Prior Publication Data
US 2022/0229344 A1 Jul. 21, 2022

Related U.S. Application Data

(60) Provisional application No. 63/138,363, filed on Jan. 15, 2021.

(51) Int. Cl.
*G02F 1/35* (2006.01)
*G01S 13/89* (2006.01)

(52) U.S. Cl.
CPC ............ *G02F 1/3544* (2013.01); *G01S 13/89* (2013.01); *G02F 2203/56* (2013.01)

(58) Field of Classification Search
CPC .... G02F 2203/56; G02F 1/3544; G01S 13/89; G01S 7/2921; G01S 7/03; G01S 7/2883; G01S 7/027
See application file for complete search history.

(56) References Cited

U.S. PATENT DOCUMENTS

| | | | | |
|---|---|---|---|---|
| 5,835,199 A | * | 11/1998 | Phillips | G01S 17/89 356/28.5 |
| 2004/0264977 A1 | * | 12/2004 | Yap | G02F 2/02 398/161 |
| 2015/0159990 A1 | * | 6/2015 | Plusquellic | G01N 21/255 359/279 |
| 2020/0014167 A1 | * | 1/2020 | Rolland | H01S 3/1307 |
| 2020/0127672 A1 | * | 4/2020 | Regazzi | H04B 1/16 |
| 2021/0033718 A1 | * | 2/2021 | Kobayashi | G01S 7/282 |
| 2022/0146312 A1 | * | 5/2022 | Schilt | G01J 3/453 |

* cited by examiner

*Primary Examiner* — Peter M Bythrow

(57) ABSTRACT

A microwave imaging system is provided. The microwave imaging system comprises a dual-comb transceiver module and a processing module. The dual comb transceiver module comprises a transmitter module for transmitting an output signal, at least one receiver module for receiving the output signal from the transmitter via a channel and for generating a first output signal, and a reference receiver module for receiving a portion of the output signal transmitted by the transmitter module via an attenuator module and for generating a second output signal. Further, one or more channel parameters associated with the microwave imaging are determined based on the first output signal and the second output signal.

20 Claims, 9 Drawing Sheets

SYSTEM AND METHOD FOR DUAL-COMB MICROWAVE IMAGING

TECHNOLOGICAL FIELD

The disclosure is related to microwave imaging, and more particularly related to a system and method for dual-comb microwave imaging.

BACKGROUND

Recent advancements in microwave imaging have allowed development of microwave imaging systems that can generate two-dimensional and three-dimensional microwave images of objects. The microwave imaging is used to evaluate hidden or embedded objects in a structure using electromagnetic waves. To that end, parameters associated with the objects are analyzed/measured based on the electromagnetic waves. Generally, microwave sensing and imaging technology is applicable for disease diagnosis, early cancer detection, food safety and quality control, material characterization, and the like. Measurement techniques for microwave sensing and imaging can be classified as frequency-domain or time-domain techniques.

In frequency-domain measurement techniques, the excitation signal is a continuous sine-wave signal, and the frequency of the sine-wave signal is swept to cover the bandwidth of interest. A vector network analyser (VNA) is a common instrument used for frequency-domain measurements, which is used to measure frequency-domain data by measuring the scattering parameters. On the other hand, in the time-domain technique, the excitation signal is an instantaneous short-duration pulse that simultaneously contains the frequency bandwidth of interest. For example, a dual-comb system of measurement, which is a time-domain measurement technique, enables capturing of a broadband time-domain signal with low sampling rate Analog-to-Digital (ADC) without using the equivalent time sampling method. The dual-comb measurement system is used in applications of broadband sensing and imaging. Further, in some cases where measurement system is designed for operation in a specific frequency range (e.g., from 3 to 10 GHz), an arbitrary waveform generator is utilized with a VNA and a high-speed oscilloscope for signal generation and acquisition, respectively.

Another example of a measurement system is a discrete dual-comb spectroscopy system, which uses a customized pulse shaping circuit with square-wave input from function generator for signal generation and an oscilloscope for signal acquisition, or an integrated dual-comb spectroscopy system using an external high-frequency signal source as the input of pulse shaping circuitry. However, the existing measurement techniques are not able to determine complete information of the object subjected to analysis/measurement. In particular, it is challenging to determine complex parameters, which provide additional information of the object.

SUMMARY

Accordingly, it is an objective of some embodiments to provide a self-sustained discrete dual-comb measurement system independent of any external laboratory equipment, which can determine complex parameters of objects subjected to microwave imaging.

According to an embodiment, the present disclosure provides a microwave imaging system. The microwave imaging system comprises a dual-comb transceiver module comprising: a transmitter module configured to transmit an output signal; at least one receiver module configured to receive the output signal from the transmitter via a channel and generate a first output signal; and a reference receiver module configured to receive a portion of the output signal transmitted by the transmitter module via an attenuator module; and generate a second output signal, wherein one or more channel parameters associated with the microwave imaging are determined based on the first output signal and the second output signal.

According to an embodiment, the present disclosure provides a method for microwave imaging is provided. The method comprises: transmitting an output signal from a transmitter to at least one receiver module via a channel; transmitting a portion of the output signal from the transmitter to a reference receiver module via an attenuator module; generating a first output signal by the at least one receiver module and a second output signal by the reference receiver module; and determining one or channel parameters associated with the microwave imaging based on the first output signal and the second output signal.

According to yet another embodiment, a dual-comb transceiver is provided. The dual-comb transceiver comprises a transmitter module configured to transmit an output signal; at least one receiver module configured to receive the output signal from the transmitter via a channel; and generate a first output signal; and a reference receiver module configured to receive a portion of the output signal transmitted by the transmitter module via an attenuator module; and generate a second output signal, wherein one or more channel parameters associated with the channel are determined based on the first output signal and the second output signal.

BRIEF DESCRIPTION OF DRAWINGS

Figure 1A:
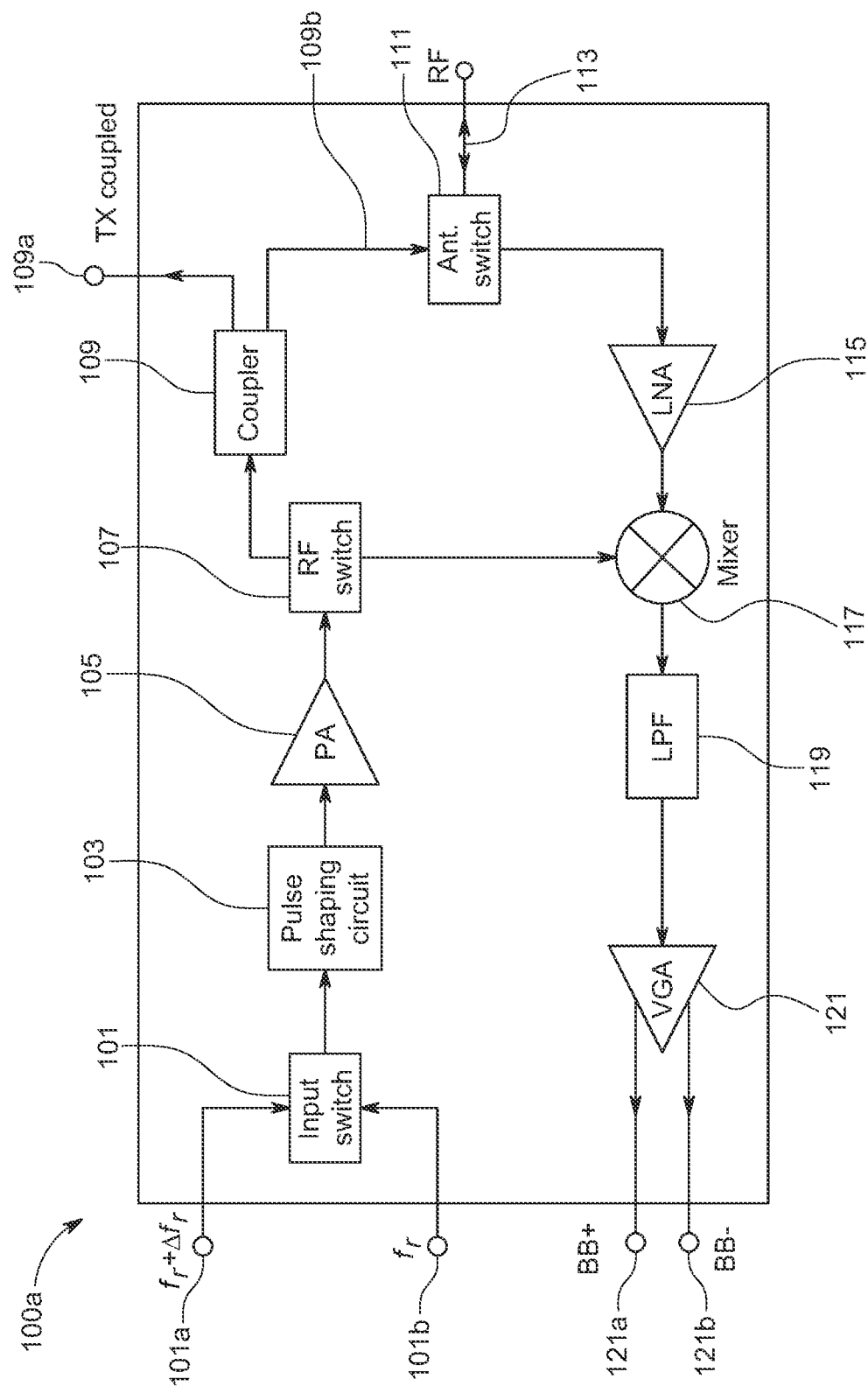
Figure 1B:
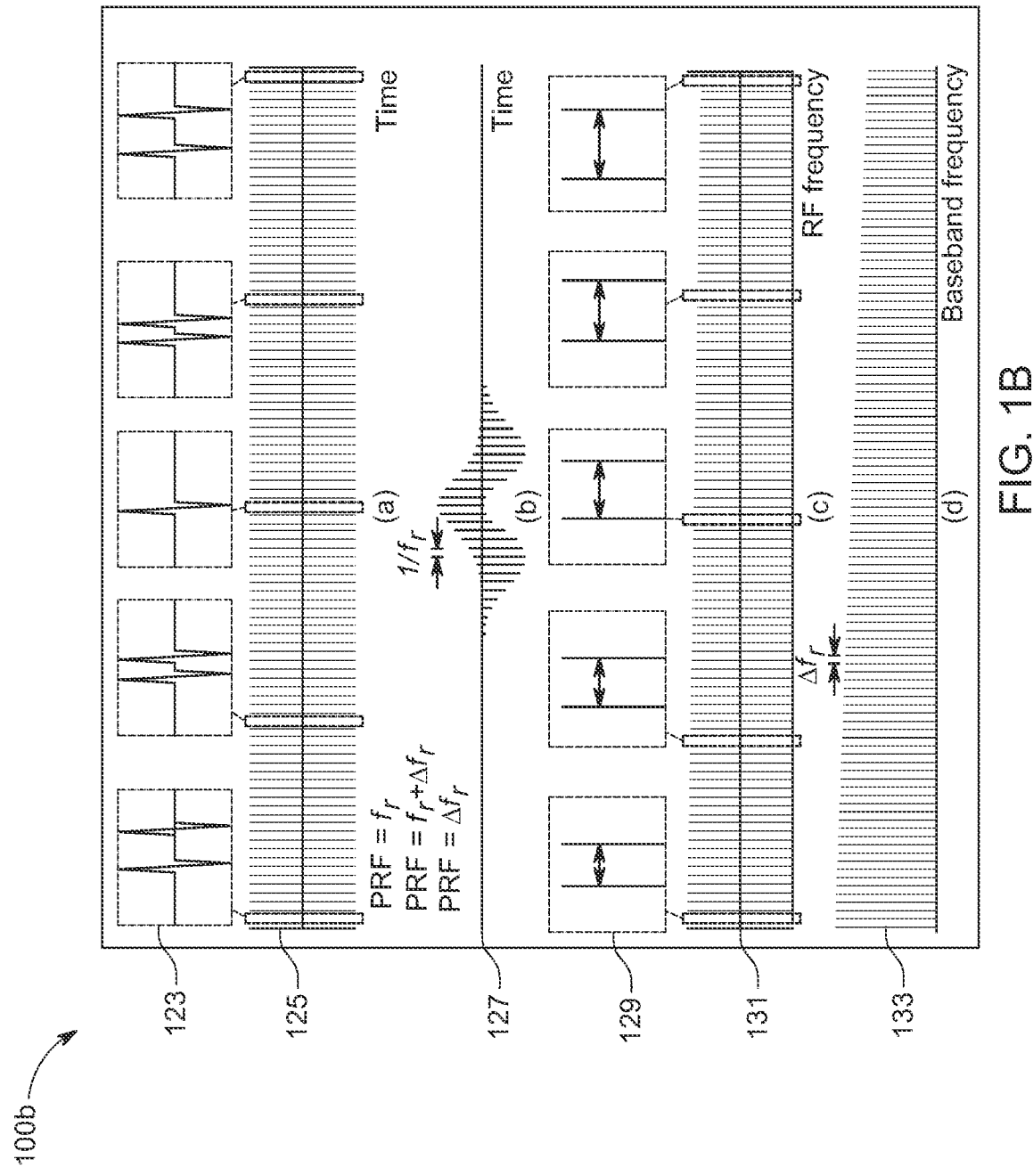
Figure 2:
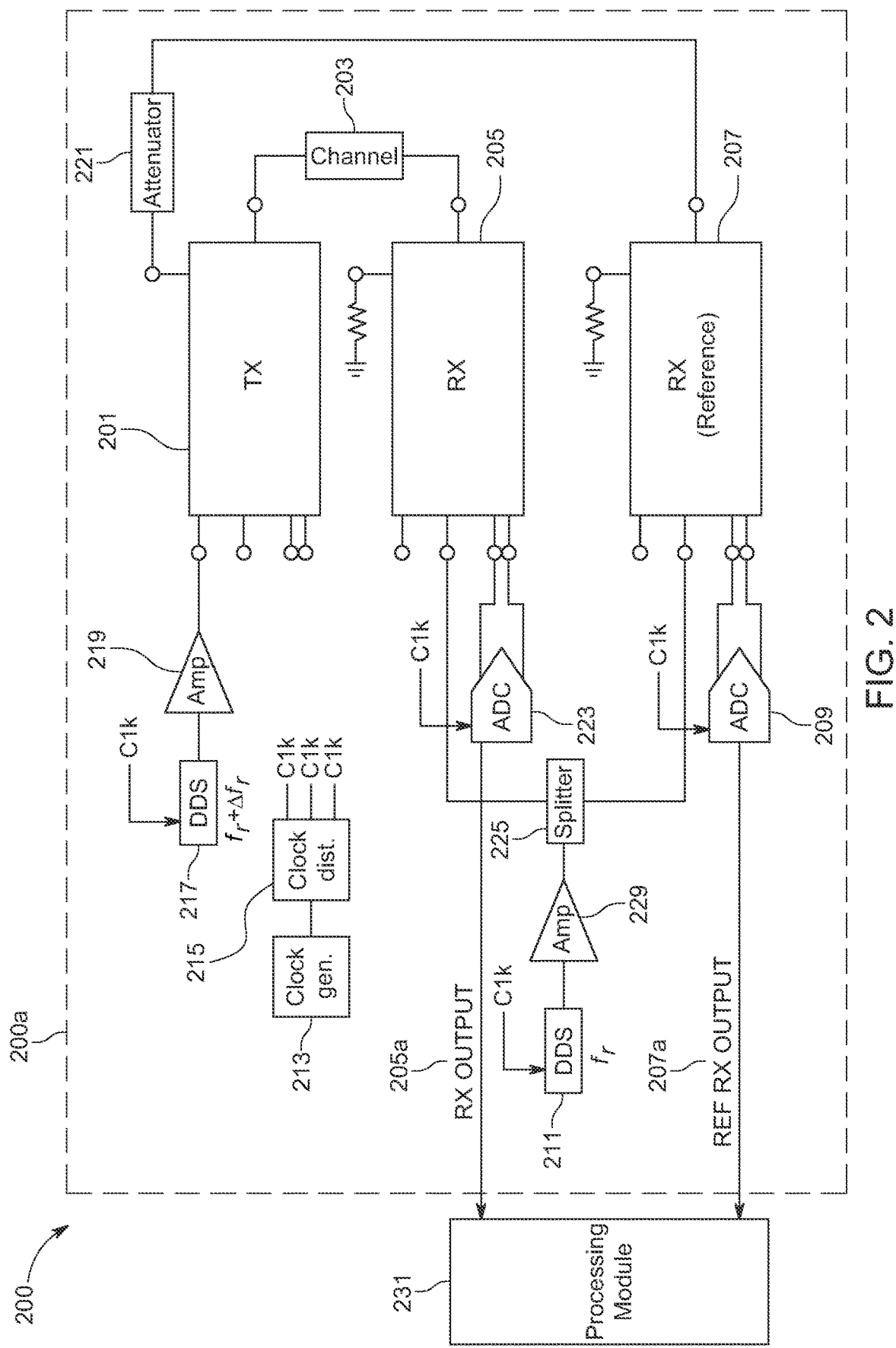
Figure 3:
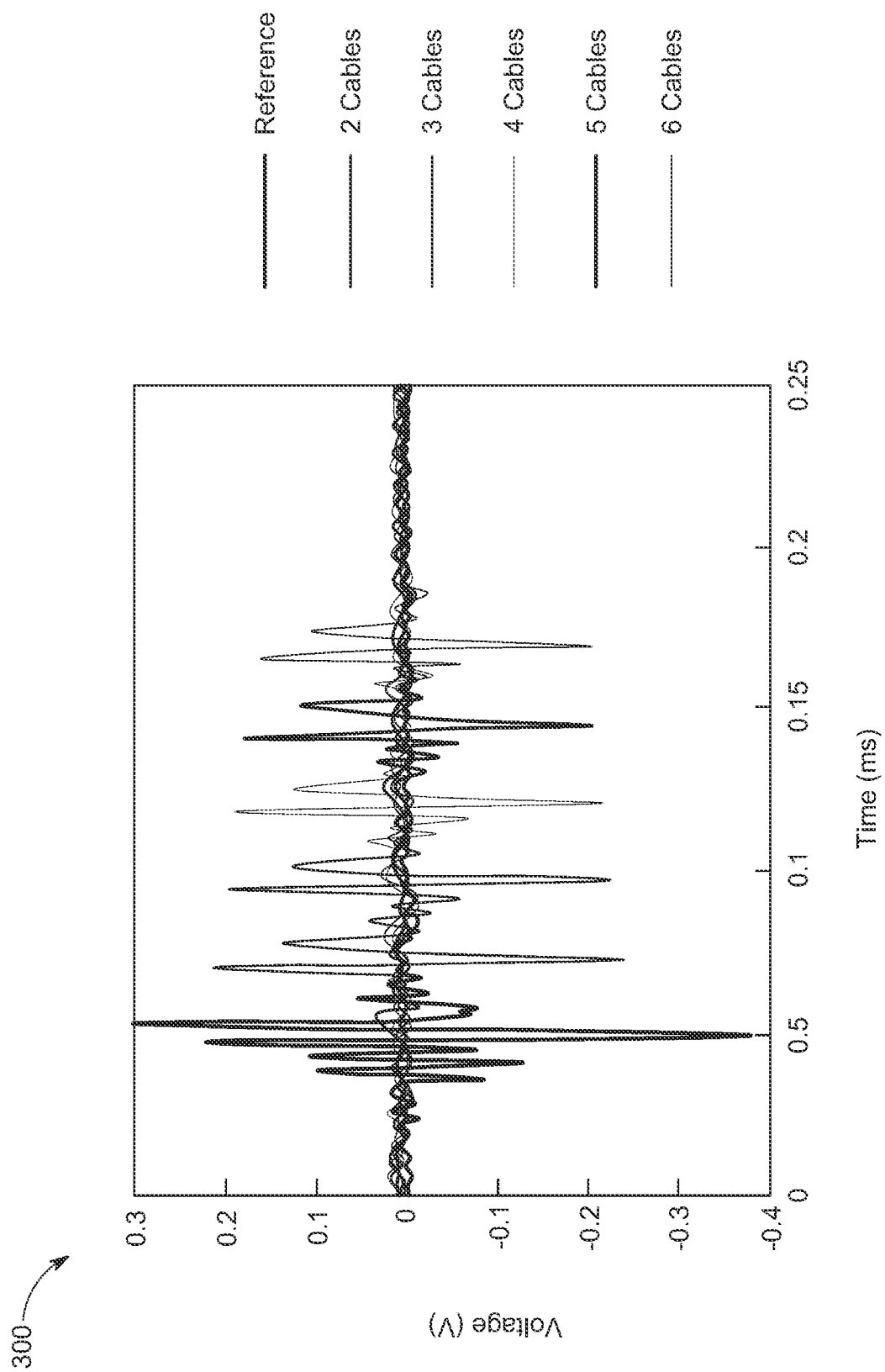
Figure 4:
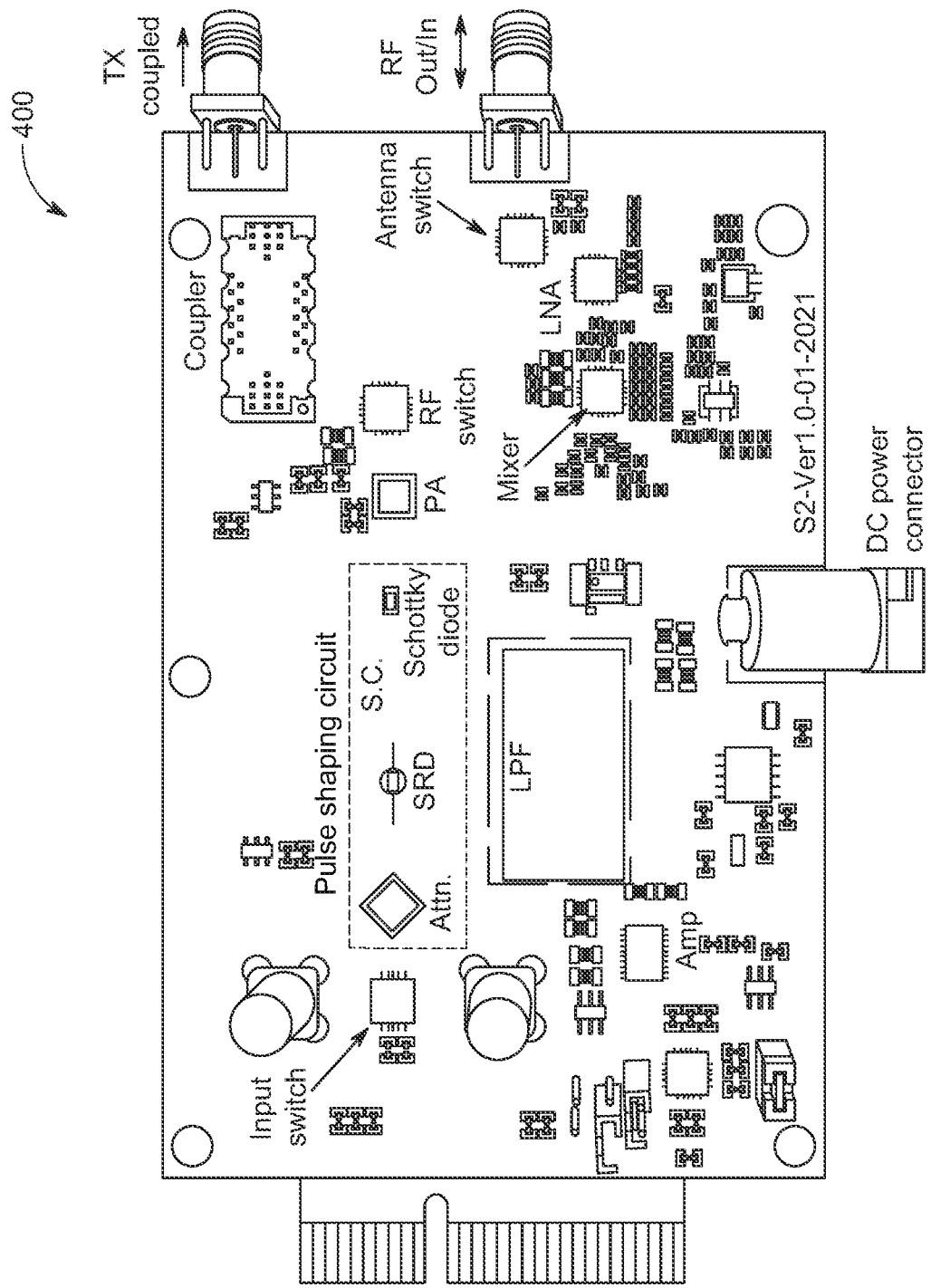
Figure 5:
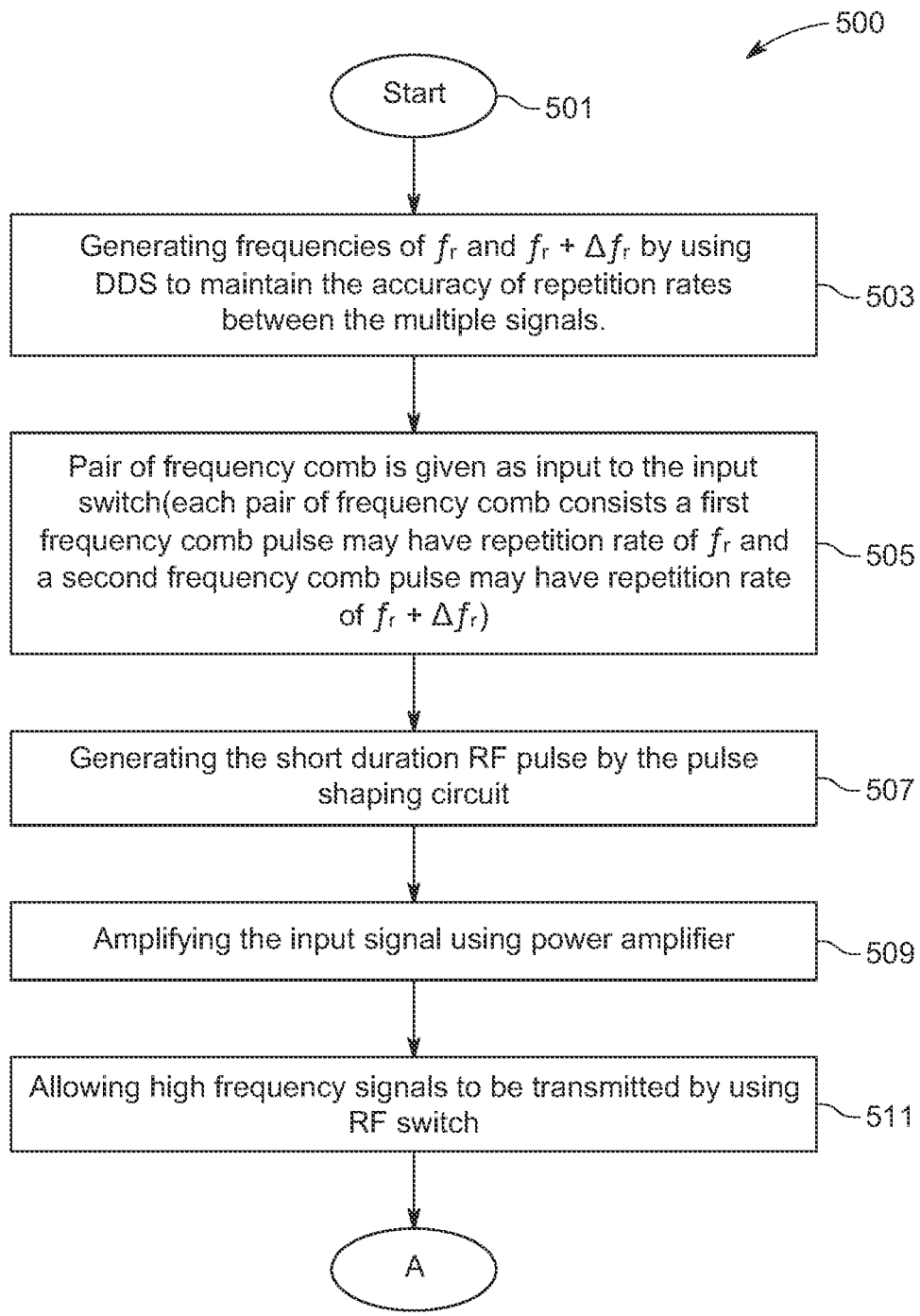
Figure 5:
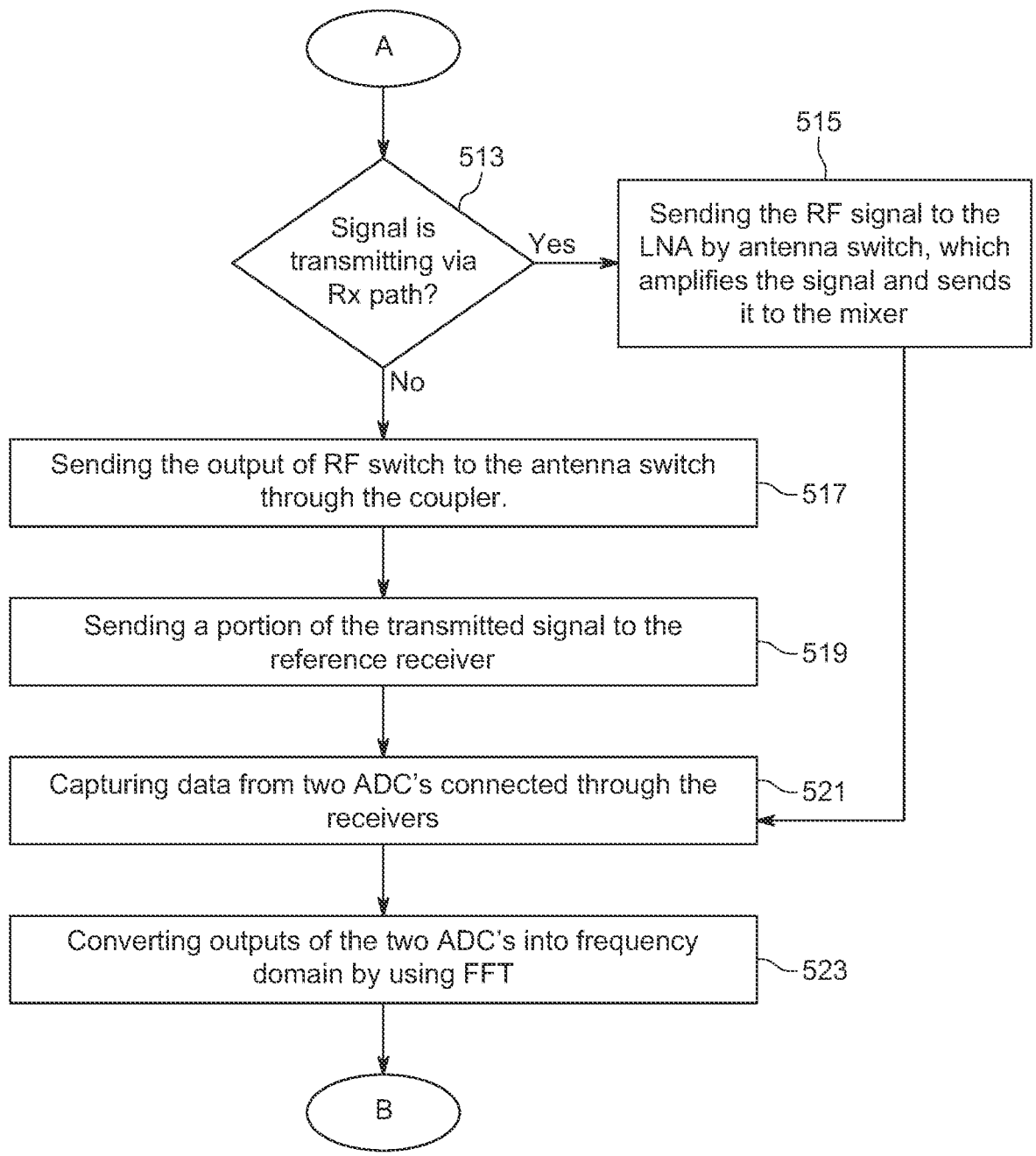
Figure 5:
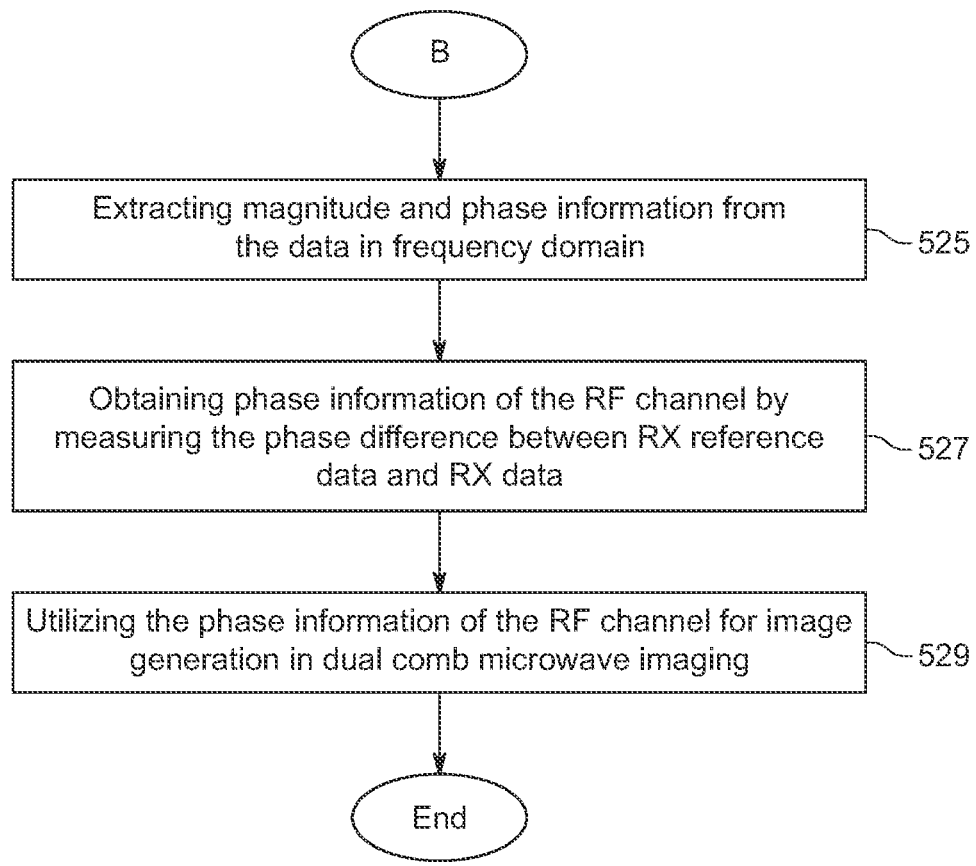
Figure 6:
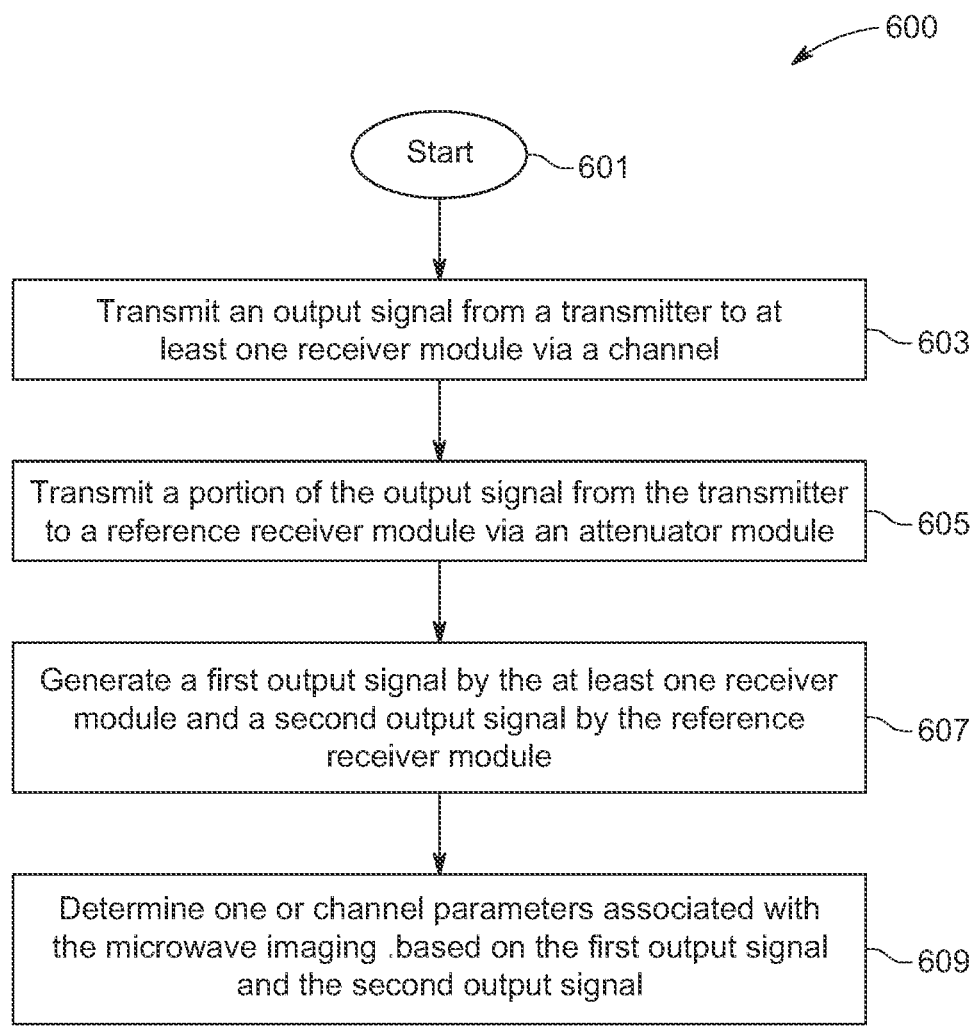

Having thus described example embodiments of the present disclosure in general terms, reference will now be made to the accompanying drawings, which are not necessarily drawn to scale, and wherein:

FIG. 1A illustrates a block diagram of a dual-comb transceiver, according to an embodiment of the present disclosure;

FIG. 1B illustrates graphical representation of waveforms of operations of the dual-comb transceiver, according to an embodiment of the present disclosure;

FIG. 2 illustrates a block diagram of a microwave imaging system, according to an embodiment of the present disclosure;

FIG. 3 illustrates a graph showing response of the dual-comb transceiver shown in FIG. 2 to different attenuations, according to another embodiment of the present disclosure;

FIG. 4 illustrates an integrated circuit diagram of the dual-comb transceiver of FIG. 2, according to an embodiment of the present disclosure;

FIG. 5 illustrates a flow diagram of a method for microwave imaging using the dual-comb transceiver of FIG. 2, according to another embodiment of the present disclosure; and FIG. 6 illustrates a flow diagram of a method for microwave imaging, according to an embodiment of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the present disclosure are shown. Indeed, various embodiments of the present disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus (or a system) to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Various embodiments provide a method and system for microwave imaging. The method and system provide for dual-comb microwave imaging based on a system including at least a main receiver and a reference receiver. The reference receiver is used to capture the output from a transmitter component in the system for measuring complete time response of a channel, based on delay and phase information obtained from the signal captured by the reference receiver.

FIG. 1A illustrates a block diagram of a dual-comb transceiver 100a, according to an embodiment of the present disclosure. The dual-comb transceiver 100a may include an input switch 101, a pulse shaping circuit 103, a power amplifier (PA) 105, an RF switch 107, a coupler 109, an antenna switch 111, and an RF port 113. The dual-comb transceiver 100a may further include a low noise amplifier (LNA) 115, a mixer 117, a low pass filter (LPF) 119, and a variable gain amplifier (VGA) 121. In some embodiments, the input switch 101 of the dual-comb transceiver 100a obtains a pair of frequency combs, which are signals comprising a radio frequency (RF) pulse having specific frequencies which are spaced apart by a small numerical factor. For example, the input switch 101 receives two signals of frequencies $f_r$ 101b and $(f_r+\Delta f_r)$ 101a as input pulses. Further, the input switch 101 selects between the pair of frequencies $f_r$ 101b and $(f_r+\Delta f_r)$ 101a to provide one of the pair of frequencies $f_r$ 101b or $(f_r+\Delta f_r)$ 101a to the pulse shaping circuit 103. The pulse shaping circuit 103 includes an attenuator, a step recovery diode (SRD), a short-circuited stub, and a Schottky diode (not shown in the figure). The pulse shaping circuit 103 converts input signals (i.e., the input pulse received from the input switch 101) into a short duration pulse to generate a periodic pulse of a specific frequency. For example, the pulse-shaping circuit 103 generates a wideband pulse of frequency in the range of 1 to 3 GHz.

The output (i.e., the periodic pulse of the specific frequency) from the pulse shaping circuit 103 may be further provided to a power amplifier (PA) 105. The PA 105 amplifies the periodic pulse of the pulse shaping circuit 103 and forwards the amplified periodic pulse signal to the radio frequency (RF) switch 107. The RF switch 107 forwards the output of the PA 105 to a transmission (TX) path and a receiver (RX) path. The TX path is formed by the coupler 109 and the RF port 113. The RX path is formed by the LNA 115, the mixer 117, the LPF 119, and the VGA 121.

In case of the TX path, the amplified periodic pulse from the PA 105 is passed through the coupler 109 and then is forwarded via a signal path 109b, to the RF port 113 by the antenna switch 111. In particular, the amplified periodic pulse is transmitted to an object which is subjected to the microwave imaging. The transmitted periodic pulse is received by a surface of the object. In response to the reception of the periodic pulse on the surface of the object, scattered electromagnetic (EM) fields are detected and processed. The scattered EM field (also called as "a received periodic pulse") is further received by the dual-comb transceiver 100a from the object subjected to microwave imaging. To that end, the RF port 113 receives the periodic pulse (i.e., the scattered EM fields) from the object.

In case the RF switch 107 forwards the amplified periodic pulse to the RX path, the amplified periodic pulse is used as a local oscillator (LO) signal of the mixer 117 for the purpose of multiplication with the received pulse from the RF port 113. The mixer 117 (i.e., a frequency mixer) is a nonlinear electrical circuit, where the mixer 117 generates new frequencies by combining two signals (e.g., the amplified periodic pulse and the received periodic pulse). An output of the mixer 117 is referred to as an intermediate frequency (IF). In the receiver (RX) path, the amplified period pulse enters the mixer 117 via the LNA 115, which is an electronic amplifier that amplifies a low-power signal without lowering the signal-to-noise ratio. The LNA 115 boosts the power of both the signal and the noise at its input, but it also introduces some noise.

The frequency domain output of the mixer 117 is periodic, with a repetition rate of $f_r$. The LPF 119 preserves the output of the mixer 117 at a lowest period while filtering out the remainder. The LPF 119 decreases a pulse amplitude in the time domain while allowing an output pulse to be captured using a low sampling rate analog-to-digital converter (ADC).

Further, output of the LPF 119 is amplified by the VGA 121. The VGA 121 is an electronic device (amplifier) that changes its gain in response to a control voltage applied to it. Based on the amplification, the VGA 121 generates output signals 121a and 121b, which may be used further to determine one or more channel parameters associated with the microwave imaging.

During operation, in the dual-comb system 100a, a pair of frequency combs is used. As used herein, a frequency comb is a signal whose spectrum consists of a series of discrete, equally spaced frequency lines. In the dual-comb system 100a, each of the pair of frequency combs has a different repetition rate. For example, the repetition rate of comb 1 may be $f_r$ and the repetition rate of comb2 may be ($f_r+\Delta f_r$). To that end, the TX path may be connected to a direct digital synthesizer (DDS) and an amplifier through the input switch 101. The DDS generates a sinewave with the frequency of fr+Δfr.

The dual-comb transceiver 100a operates in half-duplex mode, such that at any time, either the TX path is active, or the RX path is active. When the TX path is active, the RF switch 107 in TX path connects the output (i.e., the amplified periodic pulse) of the PA 105 to the coupler 109 and the antenna switch 111 sends out the output of the coupler 109 via signal path 109a. When the RX path is active, another DDS is connected with the dual-comb transceiver 100a, where the DDS outputs a sinewave signal with the frequency of fr. Further, the RF switch 107 connects the output of the PA 105 to an LO port of the mixer 117 and the antenna switch 111 directs an RF input signal to the LNA 115 in the receive path. The output of RX path is further connected to an ADC through an ADC driver. In some cases, the two DDS's and the ADC receive the same clock shared by a clock distribution network (shown later in FIG. 2). The clock distribution network is an on-chip interconnect network which ensures a correct operation of a circuit (e.g., the dual-comb transceiver 100a). The clock distribution network delivers a synchronizing signal across the dual-comb transceiver 100a to coordinate flow of data. Accordingly, a dual-comb measurement system is facilitated which is fast, miniaturized, self-sustained, and highly precise for broadband sensing and imaging.

FIG. 1B illustrates graphical diagrams of waveforms of operations of the dual-comb transceiver 100a, according to an embodiment of the present disclosure. In FIG. 1B, there is shown a plurality of waveforms (e.g., a waveform 123, a waveform 125, a waveform 127, a waveform 129, a waveform 131, and a waveform 133). In some embodiments, a pulse repetition frequency (PRF) of $f_r$ is multiplied by a second RF periodic pulse with a slightly different PRF of $f_r+\Delta f_r$ to produce a third periodic pulse with the PRF of $\Delta f_r$ in the dual-comb transceiver 100a. If one of the RF periodic pulses (i.e., $f_r$ and $f_r+\Delta f_r$) travels through an RF channel before the multiplication, the outcome is the third comb, which has an entire RF channel response mapped in the base band frequency at the same time. Accordingly, the waveforms 123 and 125 show the two periodic pulses with PRF $f_r$ and $f_r+\Delta f_r$. The waveform 127 shows multiplication result of the two periodic pulses shown in waveforms 123 and 125 in time domain. The waveform 127 shows that in the result there is small value of amplitude when the two RF periodic pulses have a small overlap. As the overlap between the two periodic pulses rises, the multiplication results in a larger amplitude, and when they are aligned, the resultant pulse amplitude reaches its highest value. The signal in the waveform 127 is a consequence of one RF periodic pulse sampling the other at a sample rate of $f_r$. When the analogous spectra of RF pulses are sampled in frequency domain, sampled spectral frequency combs are obtained as a set of comb teeth spread at a distance equal to the PRF of the corresponding periodic pulse in time domain. In frequency domain, the corresponding representation of the dual-comb operation is illustrated in the waveforms 129, 131 and 133. The waveform 129 indicates multiplication result of two RF periodic pulses (e.g., two periodic pulses with PRF $f_r$ and $f_r+\Delta f_r$) in time domain. The waveform 131 indicates equivalent RF combs of the multiplication result of the two RF periodic pulses. The waveform 133 indicates convolutional result of two RF frequency combs in frequency domain. The distance between the two comb teeth rises with frequency when comparing the two frequency combs in the waveforms 129 and 131. This distance should always be less than fr in the whole bandwidth (BW) of the RF pulse in order to have one-to-one mapping of the RF spectrum to baseband spectrum in 133. This is implied by equation:

$$BW \leq \frac{mf_r}{2} = \frac{f_r^2}{2\Delta f_r}$$

where, m stands for compression factor and is equivalent to $$\frac{f_r}{\Delta f_r}.$$

It signifies that the time-domain RF pulse has been increased by m times, or that the RF bandwidth has been reduced by m times.

In some embodiments, the dual-comb transceiver 100a shown in FIG. 1A is configured to operate in GHz frequency range (e.g., 1 to 3 GHz frequency range). Some embodiments are based on realization that the frequency range of 1 to 3 GHz is a suitable compromise between spatial resolution and the attenuation of microwave signals by an object subjected to microwave imaging (e.g., a human head). Accordingly, the frequency range 1 to 3 GHz is selected to design the dual-comb transceiver 100a. To that end, the frequencies $f_r$ and $f_r+\Delta f_r$ are set to 10 MHz and 1 kHz, respectively. As a result, the compression factor m is 10000, implying that RF frequencies of 1 to 3 GHz are mapped to baseband frequencies of 100 to 300 kHz. The baseband frequency is low enough to be caught by a high-resolution ADC while remaining above the flicker noise limit.

In some embodiments, the output signals 121a and 121b may be processed further to execute microwave imaging and testing. To that end, some embodiments are based on a realization that the output signals 121a and 121b include a plurality of parameters of the object (e.g., the human head) subjected to the microwave imaging. The plurality of parameters may include, but are not limited to, electrical (i.e., electrical, and magnetic property distribution) and geometrical parameters (i.e., shape, size, and location) of the object being imaged. The plurality of parameters is processed to generate the microwave images. Accordingly, the plurality of parameters is reconstructed as images which are further processed to execute testing of the object.

Some embodiments are based on further realization that the plurality of parameters of objects may further include additional information which corresponds to complex parameters. For example, dielectric parameters at surfaces (e.g. shrinkage cavities, pores, foreign material inclusion, or cracks) within an interior of the object are the complex parameters of the object, which provides additional information that can be utilized to generate the microwave images of the object with high precision. The dielectric parameters may be permittivity and/or conductivity of the object. The permittivity parameter is a complex parameter which includes real and imaginary parts. By having both magnitude and phase information, the two real and imaginary parts of permittivity can be determined.

Accordingly, the present disclosure describes a microwave imaging system which comprises the dual-comb transceiver which is configured to determine the complex parameters of the object which is subjected to microwave imaging. The detailed description such a microwave imaging system is described further with reference to FIG. 2.

FIG. 2 illustrates a block diagram of a microwave imaging system 200, according to another embodiment of the present disclosure. As shown in FIG. 2, the microwave imaging system 200 includes a dual-comb transceiver 200a comprising a TX module 201, a RX module 205, and a reference RX module 207. The TX module 201 is connected to the RX module 205 via a channel 203. The TX module 201 corresponds to the TX path and the RX module 205 corresponds to the RX path respectively of the dual comb transceiver 100a shown in FIG. 1A. Therefore, the components of the TX path are similar to components of the TX module 201, and components of the RX path are similar to components of the RX module 205 and the reference RX module 207. In other words, the dual-comb transceiver 200 is a modified configuration of the dual-comb transceiver 100a. Accordingly, the description of the components of the TX module 201, the RX module 205, and the reference RX 207 module is omitted herein for the sake of brevity. In the dual-comb transceiver 200, an input switch (that corresponds the input switch 101 of FIG. 1A) connects the TX module 201 to a first direct digital synthesizer (DDS) 217 and an amplifier 219. The first DDS 217 generates a first output sinewave of frequency $f_r + \Delta f_r$.

Further, the dual-comb transceiver 200a includes the reference RX module 207 which is connected to the TX module 201 via an attenuator 221 in such a way that a portion of output signal from the TX module 201 is transmitted to the reference RX 207 through a coupler of the TX module 201. The coupler of the TX module 201 is similar to the coupler 109 of the TX path of the dual-comb transceiver 100a. The attenuator 221 may be connected between the TX module 201 and reference RX 207 as a channel. Due to incorporation of the attenuator 221, a signal received at the reference RX module 207 may be of low amplitude with delay as compared to the signal received by the RX module 205.

An output signal (i.e., an amplified periodic pulse) from TX module 201 is transmitted to the object which is subjected to the microwave imaging via an RF switch and an RF port of the dual-comb transceiver 200a, where the RF switch is similar to the RF switch 107 and the RF port is similar to the RF port 113 of the dual-comb transceiver 100a. The output signal is an EM wave which penetrates through the object and scattered into multiple pulses. Further, the scattered EM wave is received as an input signal by the dual-comb transceiver 200 via the RF port. The RX module 205 and the reference receiver module 207 acquire the scattered EM wave. Based on the received EM wave, the RX module 205 and the reference RX module 207 generate output signals (similar to the output signals 121a and 121b of the dual-comb transceiver 101a). Such signals may be analysed further to determine the properties of the object. For example, a first signal output by the RX module 205 is sent to ADC 223 for analog-to-digital conversion, and then the output signal from an ADC 223 is further forwarded as RX output 205a signal to a processing module 231 for processing and analysis. The processing module 231 may include a memory and a processing element. The processing element may be a "central processing unit (CPU)" or a "processor" that refers to a computer or a component of a computer that reads and executes software instructions. The memory or a "computer-readable medium" may refer to any storage for storing data accessible by a computer. Examples include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM).

Similarly, a second signal output by the reference RX module 207 is sent to an ADC 209 for analog-to-digital conversion, and then the output signal from the ADC 209 is further forwarded as reference RX output 207a signal to the processing module 231 for processing and analysis. The processing module 231 may further convert the RX output 205a signal and the reference RX output 207a signal into frequency domain by performing FFT on each of the signals, and then converted signals may be compared to find a difference between them. The difference is then used to determine one or more channel parameters, such as magnitude and phase information of the channel corresponding to the path from the TX module 201 to the RX module 205. This magnitude and phase information gives information of the complex parameters associated with the channel, which are used to correctly identify a target object of microwave imaging.

Some embodiments are based on a realization that magnitude and phase information of signals received from the object can be calculated by measuring attenuation and delay of channels of the dual-comb transceiver 200a. To that end, the output signals from both the RX module 205 and the reference RX module 207 can be compared. To that end, time delay of the signals is determined, where time taken by the signals to travel in the channels of the RX module 205 and the reference RX module 207 is called as "a time delay". In some embodiments, the time delay can also be referred to as a propagation delay. The time delays for the RX module 205 and the reference RX module 207 are different due to different channels and their respective configuration. The time delays are analysed by the processing module 231 to determine the magnitude and phase information in frequency domain by using Fast Fourier Transform (FFT). To that end, the captured data by two ADCs at the outputs of the RX module 205 and the reference RX module 207 may be processed offline in a computer, which may include or is embodied as the processing module 231. By using FFT operation, the ADC data are converted to frequency domain which has magnitude and phase information. The phase information of reference RX module 207 data is subtracted from the phase information of RX module 205 data. The resultant phase difference includes the phase information of the RF channel corresponding to the path from the TX module 201 to the RX module 205.

Accordingly, in some embodiments, a variable gain amplifier (VGA) (similar to the VGA 121 of the dual-comb transceiver 101a) of the RX module 205 outputs signals (similar to the output signals 121a and 121b of the dual-comb transceiver 101a) to the ADC 223. Subsequently, the reference RX 207 module outputs signals based on the signals received from the TX module 201 and an RF port of the dual-comb transceiver 200, where the RF port is similar to the RF port 113 of the dual-comb transceiver 101a. The output signals of the reference RX module 207 is output to the ADC 209.

In particular, the signals from each of the RX module 205 and the reference RX module 207 are connected to the splitter 225. The splitter 225 may be a power splitter. The splitter 225 is configured to split the signal from an amplifier 229 connected at output of a second DDS 211 and provide as input to both of the RX module 205 and the reference RX module 207. If the signal output by the amplifier 229 is not strong enough, the power splitter 225 is used for adding more energy in the signal.

The magnitude and phase information of the channels is calculated based on performing FFT operation of the signals of the ADC 209 and the ADC 223, such as the reference RX output 207a signal and the RX output 205a signal respectively, where the signals are associated with time delay profile. More specifically, based on the FFT of the signals, channel response is obtained for both the RX module 205 and the reference RX module 207. Further, the channel response for the RX module 205 is compared with the channel response for the reference RX module 207. Based on the comparison of the signals, one or more channel parameters are determined. For example, the channel parameters may include the magnitude and phase information for the channel, which are extracted from the FFT of the signals. To that end, the ADC 209 and the ADC 223 are synchronized by using the same clock Clk and synchronization signals. The CLK is generated by a clock generator 213 and is distributed to different components of the dual-comb transceiver 200a using a clock distribution network 215. The clock distribution network 215 is an on-chip interconnect network which ensures a correct operation of a circuit (e.g., the dual-comb transceiver 200a). The clock distribution network delivers a synchronizing signal across the dual-comb transceiver 200a to coordinate flow of data. Accordingly, the microwave imaging system 200 is facilitated which is fast, miniaturized, self-sustained, and highly precise for broadband sensing and imaging. The dual-comb transceiver 200a also includes a second DDS 211 outputs a sinewave with the frequency of fr is shared between the two RX modules. Further, the captured data by two ADC's are processed offline in computer. By using the FFT operation, the ADC data are converted to frequency domain which has magnitude and phase information. The phase of reference RX module 207 data is subtracted from the phase of RX 205 data. The resultant phase difference includes the phase information.

Accordingly, the microwave images are generated from the plurality of parameters of the object with high precision, where the plurality of parameters also includes complex parameters.

FIG. 3 illustrates a graph showing response of the dual-comb transceiver 200 to different attenuations, according to an embodiment of the present disclosure. FIG. 3 shows an output response of the dual-comb transceiver 200 with a 40 dB attenuator in a reference channel associated with the reference RX module 207 and also a 40 dB attenuator attached to 2, 3, 4, 5, or 6 cascaded LE280 coaxial cables in a main channel associated with the RX module 205. The length of cables is 50 cm with a velocity factor of 70%. Consequently, the time delay due to insertion of one cable is calculated as 2.38 ns. According to the dual-comb system output signals in FIG. 300, the measured time delay due to insertion of one cable is 24.2 ns. Because the compression factor m is 10000 and the dual-comb output signal is expanded in time by 10000, the RF time delay is 2.42 ns which is in good agreement with 2.38 ns calculated delay.

FIG. 4 illustrates an integrated circuit diagram of the dual-comb transceiver 100a, according to an embodiment of the present disclosure. As shown in FIG. 4, all the components of dual-comb transceiver 100a are fabricated on a printed circuit board (PCB). From the left side of the PCB, a peripheral component interconnect Express (PCIe) connector is utilized to apply input sine waves with frequencies of $f_r$ and $f_{r+\Delta f_r}$ and receive the output differential periodic pulse in baseband (BB) with the amplitude of BB+ 120a, and BB− 120b. The operations of the dual-comb transceiver 100a are explained above with reference to FIG. 1A and FIG. 1B.

FIG. 5 illustrates a flow diagram of microwave imaging using dual-comb transceiver, according to an embodiment of the present disclosure. The method starts at step 501 and proceeds to step 503.

At step 503, the frequency combs which are different in repetition rate are generated by using the DDS. At step 505, the pair of frequency comb is provided as input to the input switch 101 of the dual-comb transceiver 100a and in each pair of frequency comb, a first frequency comb may have repetition rate of $f_r$, and a second frequency comb pulse may have repetition rate of $f_r+\Delta f_r$.

Further, at step 507, the output of the input switch 101 is provided to the pulse shaping circuit 103 to generate the short duration pulse. At step 509, the short duration pulse is amplified by using the power amplifier 105 and passed to the RF switch 107 at step 511. The output of RF pulse follows either TX path or the RX path.

At step 513, if the RF pulse is passing via RX path, then step 515 is executed. Otherwise, step 517 is executed.

At step 513, if the RF pulse is passing via RX path, then at step 515, the RF signal is sent to the LNA 115 by the antenna switch 111, which amplifies the signal and sends it to the mixer 117.

At step 517, the output of the RF switch 107 is transmitting through the coupler 109 to the antenna switch 111. Further, at step 519, a portion of the transmitted signal is sent to the reference receiver. At step 521, the data is captured from the two ADC's which are connected to both the receivers.

At step 523, the data captured from the two ADC's is converted to frequency domain by taking FFT. Further, at step 525, magnitude and phase information are extracted from the frequency domain data.

At step 527, a phase difference between RX data and reference RX data is calculated. Using the phase difference information, the complete phase information of the RF channel is calculated. At block 529, the phase information of the RF channel obtained in the previous step, is utilized for image generation in microwave imaging systems.

According to some embodiments, another method for implementing microwave imaging is provided.

FIG. 6 illustrates a flow diagram of a method 600 for microwave imaging, according to an embodiment of the present disclosure. The method 600 starts at step 601 and proceeds to step 603.

At step 603, an output signal from a transmitter module is transmitted to at least one receiver module via a channel. For example, the output signal from the TX module 201 is transmitted to the RX module 205 via the channel 203.

Then, at step 605, a portion of the output signal from the transmitter is transmitted to a reference receiver module via an attenuator module. For example, a portion of the output signal from the TX module 201 is transmitted to the reference RX module 207 via the attenuator 221.

Further, at step 607, a first output signal is generated by the at least one receiver module and a second output signal is generated by the reference receiver module. For example, the first output signal from the RX module 205 is generated and sent to the ADC 223. Similarly, the second output signal from the reference RX module 207 is generated and sent to the ADC 209.

Then, at step 609, one or channel parameters associated with the microwave imaging may be determined, based on the first output signal and the second output signal. For example, the captured data/signals by two ADC's at the outputs of the RX module 205 and the reference RX module 207 may be processed offline in a computer, which may include or is embodied as the processing module 231. By using FFT operation, the ADC data are converted to frequency domain which has magnitude and phase information. The phase information of reference RX module 207 data is subtracted from the phase information of RX module 205 data. The resultant phase difference includes the phase information of the RF channel corresponding to the path from the TX module 201 to the RX module 205. Similarly, magnitude information may also be calculated.

In this manner, the method 600 provides for determining complete channel response for a channel in a microwave imaging system, based on off-the-shelf components, thereby providing a self-sustainable method for identifying complex parameters of a target object subjected to microwave imaging.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A microwave imaging system, comprising:
   a dual-comb transceiver module comprising:
     a transmitter module configured to transmit an output signal;
     at least one receiver module configured to receive the output signal from the transmitter via a channel and for generating a first output signal; and
     a reference receiver module configured to:
     receive a portion of the output signal transmitted by the transmitter module via an attenuator module and generate a second output signal;
     wherein one or more channel parameters associated with the microwave imaging are determined based on the first output signal and the second output signal.

2. The microwave imaging system of claim 1, further comprising:
   a first analog-to-digital converter (ADC) configured to:
     receive the first output signal; and
     to transmit a receiver (RX) output signal; and
   a second ADC configured to receive the second output signal and to transmit a reference RX output signal.

3. The microwave imaging system of claim 2, further comprising a processing module configured to:
   receive each of the RX output signal and the reference RX output signal as received signals;
   convert each of the received signals into corresponding frequency domain signals by performing Fast Fourier Transform (FFT) operation on each of the received signals;
   determine a difference between the converted signals; and
   determine the one or more channel parameters based on the difference.

4. The microwave imaging system of claim 3, wherein the one or more channel parameters comprise at least a magnitude information and a phase information associated with the channel.

5. The microwave imaging system of claim 3, wherein to determine the difference between the converted signals, the processing module is further configured to determine a time delay information associated with each of the converted signals.

6. The microwave imaging system of claim 1, wherein the dual-comb transceiver module further comprises:
   a first direct digital synthesizer (DDS) configured to generate an output sinewave of frequency $f_r+\Delta f_r$ to be input to the transmitter module; and
   a second DDS configured to generate an output sinewave of frequency $f_r$ to be input to the at least one receiver module and the reference receiver module.

7. The microwave imaging system of claim 1, wherein the dual-comb transceiver module further comprises a clock generator and a clock distribution network.

8. The microwave imaging system of claim 1, wherein the output signal from the transmitter is transmitted to a target object in the channel.

9. A method for microwave imaging, comprising:
   transmitting an output signal from a transmitter to at least one receiver module via a channel;

transmitting a portion of the output signal from the transmitter to a reference receiver module via an attenuator module;

generating a first output signal by the at least one receiver module and a second output signal by the reference receiver module; and determining one or channel parameters associated with the microwave imaging based on the first output signal and the second output signal.

10. The method of claim 9, further comprising:

converting the first output signal to a receiver (RX) output signal by a first analog-to-digital converter (ADC); and converting the second output signal to a reference RX output signal by a second ADC.

11. The method of claim 10, further comprising:

converting each of the RX output signal and the reference RX output signal into corresponding frequency domain signals by performing Fast Fourier Transform (FFT) operation on each of the signals;

determining a difference between the converted signals; and determining the one or more channel parameters based on the difference.

12. The method of claim 11, wherein the one or more channel parameters comprise at least magnitude information and phase information associated with the channel.

13. The method of claim 11, wherein determining the difference between the converted signals comprises determining time delay information associated with each of the converted signals.

14. The method of claim 9, further comprising:

generating an output sinewave of frequency $f_r+\Delta f_r$ to be input to the transmitter module; and generating an output sinewave of frequency $f_r$ to be input to the at least one receiver module and the reference receiver module.

15. The method of claim 1, further comprising generating a clock signal to be distributed to each of the transmitter module, the receiver module, and the reference receiver module, wherein the clock signal is generated and distributed by a clock generator and a clock distribution network, respectively.

16. The method of claim 9, further comprising transmitting the output signal to a target object in the channel for microwave imaging.

17. A dual-comb transceiver, comprising:

a transmitter module configured to transmit an output signal;

at least one receiver module configured to: receive the output signal from the transmitter via a channel; and generate a first output signal; and a reference receiver module configured to receive a portion of the output signal transmitted by the transmitter module via an attenuator module; and generate a second output signal, wherein one or more channel parameters associated with the channel are determined based on the first output signal and the second output signal.

18. The dual-comb transceiver of claim 17, further comprising:

a first analog-to-digital converter (ADC) configured to receive the first output signal and to transmit a receiver (RX) output signal; and a second ADC configured to receive the second output signal and to transmit a reference RX output signal.

19. The dual-comb transceiver of claim 17, further comprising:

a first DDS for generating an output sinewave of frequency $f_r+\Delta f_r$ to be input to the transmitter module; and a second DDS for generating an output sinewave of frequency $f_r$ to be input to the at least one receiver module and the reference receiver module.

20. The dual-comb transceiver of claim 17, further comprising a clock generator and a clock distribution network.

* * * * *